UNITED STATES PATENT OFFICE.

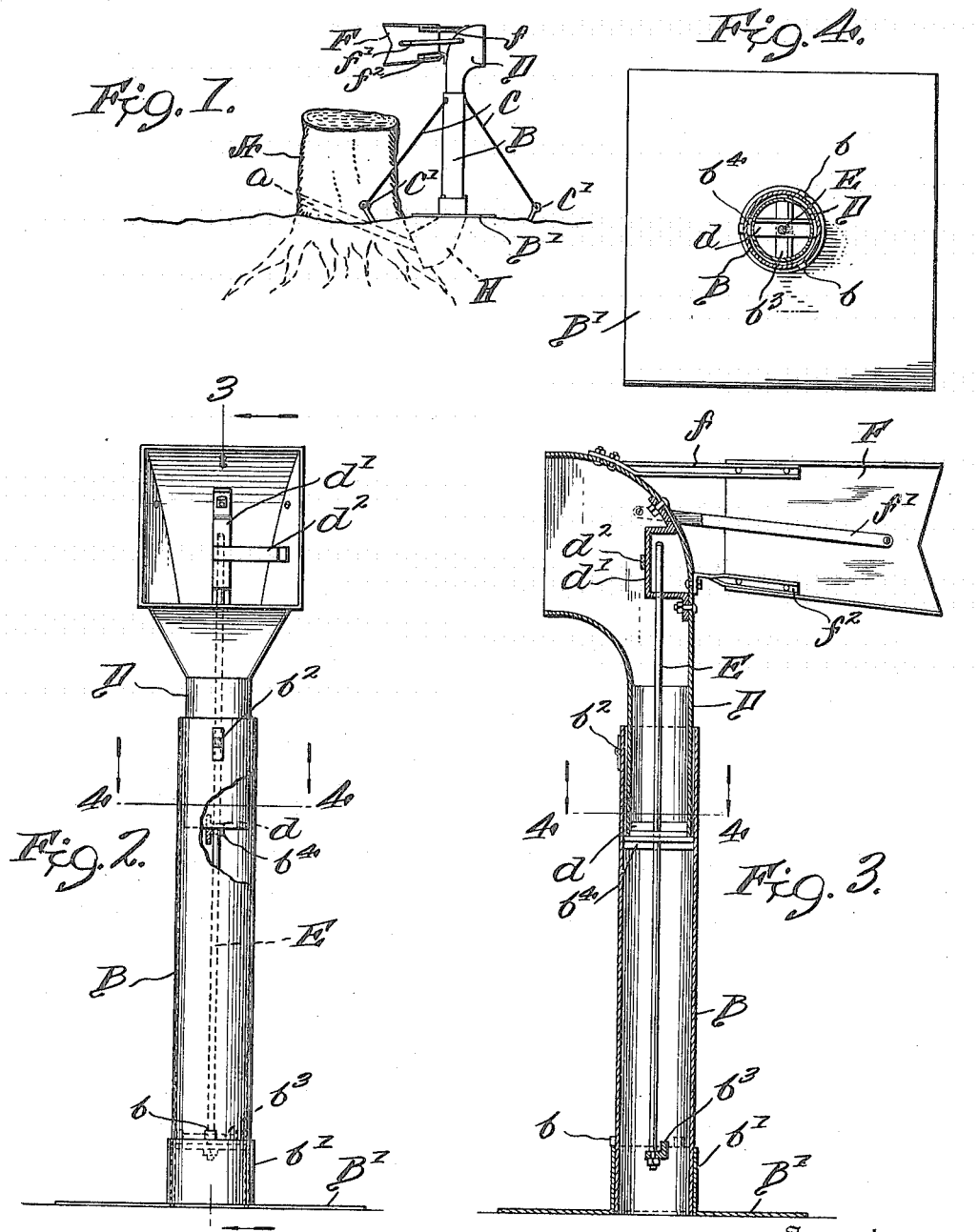

RALPH BOEHNE, OF DONIPHAN TOWNSHIP, HALL COUNTY, NEBRASKA.

APPARATUS FOR FACILITATING THE BURNING OF STUMPS.

1,213,829. Specification of Letters Patent. Patented Jan. 30, 1917.

Application filed October 9, 1916. Serial No. 124,655.

*To all whom it may concern:*

Be it known that I, RALPH BOEHNE, a citizen of the United States, residing in Doniphan township, in the county of Hall and State of Nebraska, have invented certain new and useful Improvements in Apparatus for Facilitating the Burning of Stumps; and I do hereby declare the following to be a full, clear, and exact description of the invention, such as will enable others skilled in the art to which it appertains to make and use the same.

My invention relates to apparatus for facilitating the burning of stumps.

It is customary in order to get rid of stumps on land formerly in timber, to bore a hole diagonally across the stump and to build a fire, at the lower end of the hole, and the flame passing up through this hole burns a larger and larger passage for itself until finally the whole stump is destroyed. This mode of destroying stumps, however, often proves inefficient from the fact that there is not sufficient draft of air to carry the flame through the hole in the stump, and the fire, after smoldering for some time, dies out, leaving the stump practically intact.

According to my invention, I provide means for automatically creating a forced draft whereby the flame is blown through the stump and the subsequent combustion of the stump is expedited.

My invention will be understood by reference to the accompanying drawings, in which, similar parts are indicated by similar reference symbols throughout the several views.

Figure 1 shows the stump with the apparatus attached thereto; Fig. 2 is a front elevation on a larger scale; Fig. 3 shows a section along the line 3—3 of Fig. 2, and looking in the direction of the arrows; and Fig. 4 shows a section along the line 4—4 of Fig. 3, and looking down.

A represents the stump and $a$ represents the hole bored transversely therethrough. This boring may be effected by any suitable drilling means, such as an auger.

B represents a vertical pipe, which is mounted on the base plate B', said base plate having flanged portion $b'$ which engages the lugs $b$ on the pipe B, and prevents said pipe from slipping through the base plate.

D represents a funnel having a flaring mouth and cylindrical neck, said cylindrical neck being provided with the cross bar $d$, which engages the cross bar $b^4$ in the main pipe B. This main pipe is also provided with a cross bar $b^3$ adapted to engage, receive and support the lower end of the pivot rod E, which rod passes up through the cross bars $d$ and $b^4$ and engages in the frame $d'$ in the funnel D. This frame $d'$ is braced as at $d^2$, thus forming a firm bearing for the upper end of the pivot rod E.

In the rear of the funnel, a wind vane F is provided, which is connected to the funnel by suitable braces $f$, $f'$, and $f^2$. The pipe B is provided near its top with a number of eyes, or other fastening means $b^2$, to which the stays C are connected, and these stays are preferably of wire or chain, and their lower ends are fastened to the metal pins C', which are driven in the earth, as shown in Fig. 1, and thus keep the pipe B and funnel D in the upright position.

H represents a hole dug in the earth, and in which the fire is originally built. This hole is covered by the base plate B' and the force of the wind causes the air to be blown down through the funnel D into this hole or chamber H, forcing the flame from the fire to pass up through the hole $a$ in the stump A.

It will be noted that the wind vane F will cause the funnel D to always turn to the direction of the wind, and air will be automatically caused to flow down the pipe B and into the chamber H, and through the hole $a$ into the stump.

While I have shown the mouth of the funnel D as rectangular in cross section, it will be obvious that it may be made circular or elliptical in cross section. Moreover, if desired, suitable anti-friction bearings may be provided to facilitate the ready turning of the funnel in the pipe B.

It will be obvious that these and other changes might be made in the herein described apparatus and in the construction, combination and arrangement of parts which could be used without departing from the spirit of my invention.

Having thus described my invention, what I claim and desire to secure by Letters Patent of the United States is:

Apparatus for facilitating the burning of stumps comprising a base plate having a tubular flanged central portion, said plate being adapted to rest on the ground to cover a recess therein adjacent to the stump, a stand pipe mounted in said tubular flanged central portion, and a funnel revolubly mounted in said stand pipe, and provided with a wind vane attached to the rear thereof whereby the mouth of said funnel is automatically turned in the direction from which the wind is coming, substantially as described.

In testimony whereof, I affix my signature.

RALPH BOEHNE.

Copies of this patent may be obtained for five cents each, by addressing the "Commissioner of Patents, Washington, D. C."